United States Patent [19]

Blanton

[11] 4,144,873

[45] Mar. 20, 1979

[54] APPARATUS FOR REFRACTING, CONCENTRATING AND COLLECTING SOLAR RADIATION

[76] Inventor: C. Kenneth Blanton, #49 Pahlavi Pahlavan, Tehran, Iran

[21] Appl. No.: 697,704

[22] Filed: Jun. 21, 1976

[51] Int. Cl.² .............................................. F24J 3/02
[52] U.S. Cl. ............................... 126/271; 237/1 A; 60/641
[58] Field of Search ............... 126/270, 271; 237/1 A; 60/641; 350/199, 193, 192, 190, 167, 168, 96 R; 165/45; 204/129; 136/89 PC

[56] References Cited

U.S. PATENT DOCUMENTS

| | | | |
|---|---|---|---|
| 893,060 | 7/1908 | Dobbins | 350/190 |
| 1,068,650 | 7/1913 | Harrison | 126/271 |
| 1,345,758 | 6/1920 | Folsom | 126/271 |
| 1,588,214 | 6/1926 | Walsh | 204/129 |
| 1,989,999 | 2/1935 | Niederle | 126/271 |
| 3,529,117 | 9/1970 | Costello | 350/190 |
| 3,841,738 | 10/1974 | Caplan | 60/641 X |
| 3,915,147 | 10/1975 | Rineer | 126/271 |
| 4,030,890 | 6/1977 | Diggs | 126/271 X |
| 4,042,758 | 8/1977 | Weinstein et al. | 126/271 X |

*Primary Examiner*—William F. O'Dea
*Assistant Examiner*—Larry Jones
*Attorney, Agent, or Firm*—Duckworth, Hobby, Allen & Pettis

[57] ABSTRACT

A solar energy collection device includes an oblong pedestal with a heat absorbing hollow cylinder carried upon the pinnacle of the pedestal through which a heat absorbing fluid is moved. A transparent, generally cylindrical member is carried by the pedestal and encircles at least a portion of the cylinder for concentrating and transferring radiant energy incident to the periphery of the member to the heat absorbing cylinder, and thence to the fluid passing therethrough.

5 Claims, 5 Drawing Figures

APPARATUS FOR REFRACTING, CONCENTRATING AND COLLECTING SOLAR RADIATION

BACKGROUND OF THE INVENTION

1. Field of the Invention

The present invention relates to solar energy collectors, and in particular relates to solar collectors which are adapted to refract and concentrate solar energy throughout the solar year.

2. Description of the Prior Art

There are a number of prior art arrangements which teach apparatus for refracting, concentrating and collecting solar energy. In particular, Sleeper discloses, in U.S. Pat. No. 3,125,019, an inflatable sphere having a plurality of lens positioned along the inner periphery of the inflatable sphere for refracting and concentrating the incident solar radiation onto a heat absorbing element coontained within the sphere.

In U.S. Pat. No. 3,868,823, Russell et al disclose a concentrator having reflective surfaces which move in response to changes in the angle of incident solar radiation. As disclosed by Russell et al, the reflector constitutes a section of a cylinder disposed horizontally along the ground surface.

In U.S. Pat. No. 3,847,136, Salvail discloses a plurality of parabolic-like elements in a solar collector, and means for changing the position of each reflector in order to track the movement of the sun, for maximum efficiency.

In U.S. Pat. No. 3,321,012, Harvey teaches a fixed parabolic dish arrangement employing a flat plate collector disposed vertically along the center line of each parabolic reflector, such that the overall combination is rendered more efficient dependent upon the incidence of solar radiation.

Kelly in U.S. Pat. No. 3,490,996 discloses a cylindrical heat absorbing element adapted to vaporize and lift fluids. A somewhat related arrangement is also disclosed by Kelly in U.S. Pat. No. 3,414,481.

An inflatable spherical collector arrangement similar to that disclosed by Sleeper, referred to above, is also disclosed in U.S. Pat. No. 3,390,056 to Ingram.

Other U.S. Pat. Nos. of interest include the following: 3,351,536 to Fox; 389,125 to Weston; 3,460,930 to Pityo; and 3,549,503 to Hay.

SUMMARY OF THE INVENTION

The present invention contemplates a solar collection device for refracting, concentrating and collecting radiant energy and comprises an oblong pedestal with a heat absorbing hollow cylinder carried upon the pinnacle of the pedestal. A transparent, generally cylindrical member is carried upon the pedestal and encircles at least a portion of the cylinder for concentrating and transferring radiant energy incident to the periphery of the member to the heat absorbing cylinder throughout the solar day.

In a preferred embodiment, the refractive member comprises a cylinder having a section removed, with the pedestal occupying the removed section, and with the axis of the refractive member being substantially coaxial with the axis of the hollow cylinder. Preferably, the cylinder-refractive member combination is disposed with the axis of the cylinder substantially normal to the mean inclination of radiation from the sun, in order to obtain the maximum benefit of solar radiation throughout the solar year.

THE DRAWING

DETAILED DESCRIPTION

A preferred embodiment of the present invention will now be described with reference to the drawings.

Figure 1:
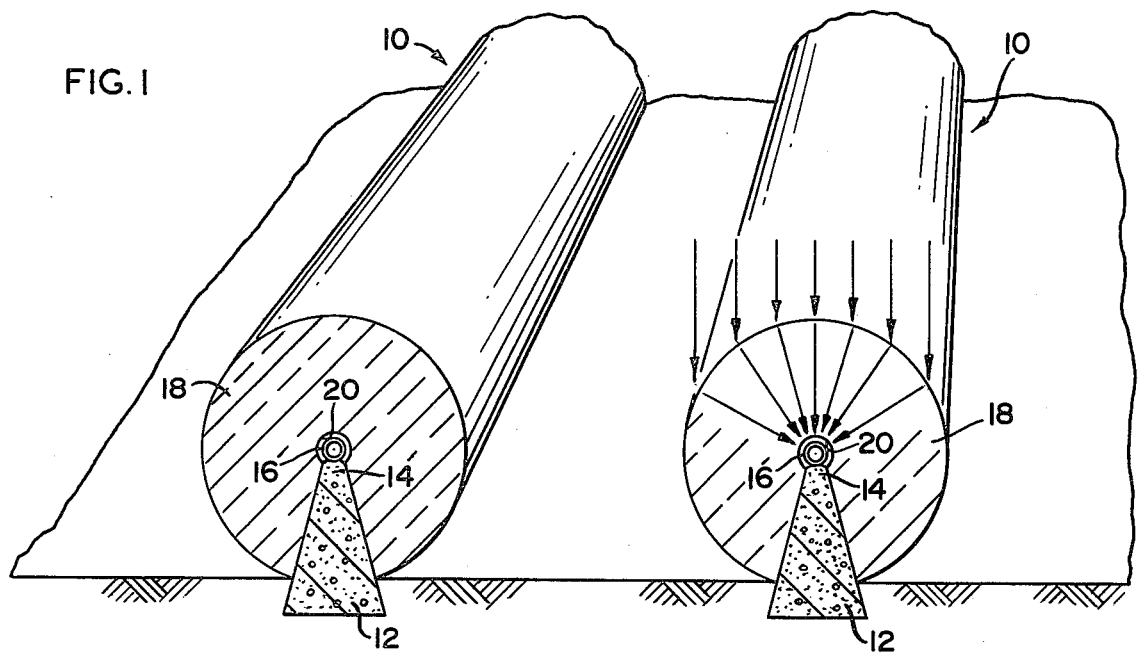
FIG. 1 is a perspective view, partially cut-away, illustrating one embodiment of apparatus in accordance with the present invention.
Figure 2:
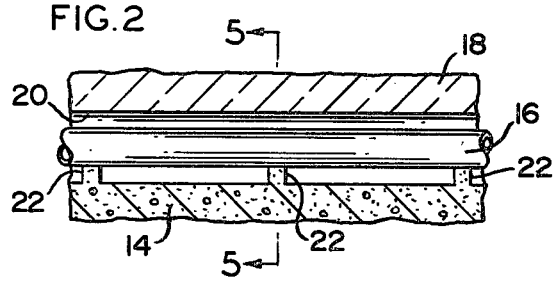
FIG. 2 is a cross-section of a portion of the apparatus shown in FIG. 1.

Noting FIG. 1, the refracting, concentrating and collecting apparatus, referred to generally as 10, comprises an oblong pedestal 12 which preferably has a generally triangular cross-sectional shape and the bottom portion of which is suitably buried in the ground for anchoring purposes. The pedestal includes a pinnacle 14 which carries a hollow cylinder 16, preferably having a black, heat absorbing peripheral surface, the cylinder 16 being spaced from the pedestal 12 by a plurality of spacing elements 22 (note FIG. 2) extending along the pinnacle 14 of the pedestal 12.

Referring again to FIG. 1, the apparatus 10 further includes a transparent, generally cylindrical member carried by the pedestal and extending substantially the full length of the cylinder 16, the member 18 comprising a material capable of refracting incident solar radiation (note arrows on right hand side of FIG. 1) and concentrating that incident solar radiation by bending the light waves toward the heat absorbing hollow cylinder 16 carried upon the pinnacle 14 of the pedestal 12. In accordance with this invention, the member 18 comprises a solid material of uniform thickness, and is formed of a cylinder having a section removed with the pedestal 12 occupying the removed section, the axis of the member 18 being substantially coaxial with the axis of the hollow cylinder 16. Preferably, a space 20 is provided between the cylinder 16 and the member 18, so as to allow a vacuum to be created in that space.

It will thus be appreciated by those skilled in the art that a heat collection fluid, such as water, freon or the like, may be passed through the heat absorbing cylinder 16, such that heat absorbed thereby will be transferred to the fluid and subsequently removed as heat energy from the apparatus 10. It will further be understood by those skilled in the art that the use of the generally cylindrical member 18 which substantially surrounds the heat absorbing element 16 allows an extremely efficient absorption of solar energy throughout the solar day, without the requirement of moving the heat absorbing element or a reflective shield. This advantage obtains through the use of the solid, generally cylindrical member 18, which is capable of refracting and collecting incident solar radiation throughout a substantial portion of the periphery thereof, and for essentially all of the period in which solar radiation is incident thereto.

Figure 3:
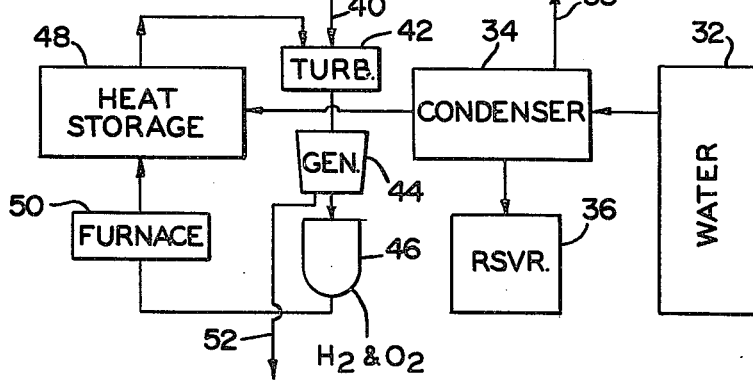
FIG. 3 is a schematic illustration of one application of the embodiment shown in FIG. 1.
Figure 5:
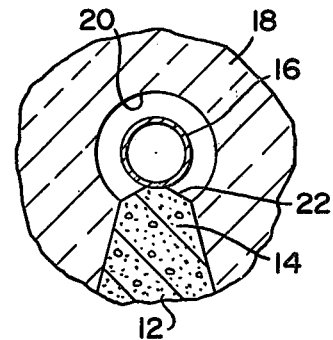
FIG. 5 is a cross-section of the apparatus shown in FIG. 2, taken along the line 5—5.

Reference is now made to FIG. 3, wherein there is shown a specific application of the apparatus 10 of FIG. 1. Noting FIG. 3, a plurality of the cylinder 16-refractive member 18 combinations are provided, each lying with the axes of all of the cylinders 16 substantially parallel with one another. The overall combination, referred to as 30, includes a source of water, such as a salt water reservoir 32, for example, which may be pumped into a condensor 34 and thence through the heat absorbing cylinder 16 associated with each apparatus 10 via an input line 38. Reservoir 36 is for the collection of excess water from condenser 34. After solar radiation is absorbed by all of the cylinder 16-refractive member 18 combinations, all of the outputs thereof are collected in an output line 40 which is passed into a turbine 42, so as to drive a generator 44 to effect separation of the constituent elements of water (hydrogen, $H_2$ and oxygen $O_2$). This output may be used in cooperation with a furnace 50, to effect continuous heat storage at 48 and to effect further operation of the turbine 42, thus creating a useful output at 52 from the generator 44.

Figure 4:
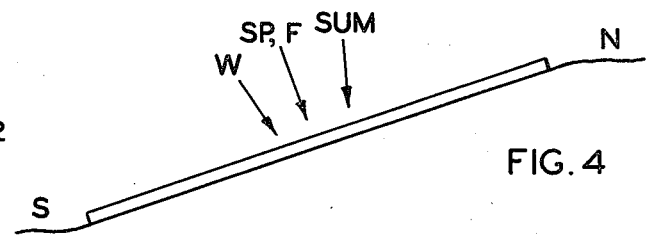
FIG. 4 is a side view illustrating a further application of the apparatus shown in FIG. 1.

Noting FIG. 4, the arrangement shown in FIG. 3 preferably is disposed with each apparatus 10 along a north-south line with the axis of the heat absorbing cylinders 16 and the refractive member cylinders 18 substantially normal to the mean angular inclination of the sun, that is with these axes substantially normal to incident solar radiation during the spring and fall (designated "SP" and "F" respectively in FIG. 4) so that maximum efficiency of the overall system 30 of FIG. 3 is obtained. Of course, the use illustrated in FIG. 4 contemplates location of the apparatus 10 in the northern hemisphere; it will be understood that a "mirror image" arrangement would be employed in the southern hemisphere, with the point of highest elevation toward the South Pole.

Further, each cylinder 18 may be fitted with filters if selection of certain types of radiant energy, e.g., infrared, ultra-violet, is desired for specific applications. In this way, the system of the present invention may be adapted for use with certain chemical, metalurgical, or desalinization processes.

It will be understood that other variations from the form of this invention may be made without departing from the spirit and scope thereof, and that the above description and the drawings are considered as merely illustrating one manner of its use.

I claim:

1. A device for refracting, concentrating and collecting radiant solar energy comprising:
    an oblong pedestal having a generally triangular cross section and plural spacing elements extending along the pinnacle of said pedestal;
    a heat absorbing hollow cylinder carried by said spacing elements of said pedestal;
    a transparent, generally cylindrical member comprising a solid, refractive material of uniform thickness carried by said pedestal and encircling at least a portion of said cylinder for concentrating and transferring substantially all of the radiant energy incident to the periphery of said member to said heat absorbing cylinder, said refractive member being relatively thicker than the cross sectional dimension of said hollow cylinder;
    said refractive member comprising a cylinder having a section removed, with said pedestal occupying said removed section, the axis of said refractive member being substantially coaxial with the axis of said hollow cylinder;
    a plurality of said pedestal-cylinder-refractive member combinations, each combination lying with axes of said cylinders substantially parallel with one another and substantially normal to the mean inclination of radiation of the sun.

2. The device recited in claim 1 further comprising means for defining a partial vacuum interposed between said cylinder and said member.

3. The device recited in claim 1 further comprising means for moving a heat absorbing fluid through all of said cylinders simultaneously.

4. The device recited in claim 3 further comprising:
    turbine means for receiving a heated fluid output from all of said cylinders and being driven thereby;
    a generator coupled to a driven output of said turbine.

5. The device recited in claim 4 further comprising means coupled to an output of said generating means for separating water into constituent hydrogen and oxygen.

* * * * *